United States Patent [19]

Kameyama et al.

[11] Patent Number: 5,638,134
[45] Date of Patent: Jun. 10, 1997

[54] DIGITAL FILTER FOR PICTURE DATA AND DIGITAL FILTER SYSTEM

[75] Inventors: Takashi Kameyama; Takashi Asaida, both of Kanagawa, Japan

[73] Assignee: Sony Corporation, Tokyo, Japan

[21] Appl. No.: 494,551

[22] Filed: Jun. 26, 1995

[30] Foreign Application Priority Data

Jun. 29, 1994 [JP] Japan .................................. 6-148306

[51] Int. Cl.⁶ .................................................. H04N 5/21
[52] U.S. Cl. ........................... 348/607; 348/624; 348/625; 348/630
[58] Field of Search .................................. 348/607, 624, 348/909, 606, 625, 630; 358/166, 167, 36, 37; 364/724.16; 382/264, 260; H04N 5/21, 5/213

[56] References Cited

U.S. PATENT DOCUMENTS 4,825,297  4/1989  Fuchsberger ........................... 348/606
5,392,137  2/1995  Okubo ..................................... 382/260

*Primary Examiner*—Sherrie Hsia
*Attorney, Agent, or Firm*—William S. Frommer; Alvin Sinderbrand

[57] ABSTRACT

A digital filter for picture data is disclosed which has a first low-pass filter having relatively steep cut-off characteristics for filtering input digital picture data, a second low-pass filter having relatively moderate cut-off characteristics for filtering input digital picture data, a mixing unit for mixing digital picture data filtered by the first and second low-pass filters, a step detecting unit for detecting changes in step-like values of the input picture data, and a control unit for controlling the mixing ratio of the digital picture data from the first and second low-pass filters by the mixing unit based on step detection outputs of the step detection unit. There is also provided a digital filter system for color picture data having the digital filter for each color.

26 Claims, 16 Drawing Sheets

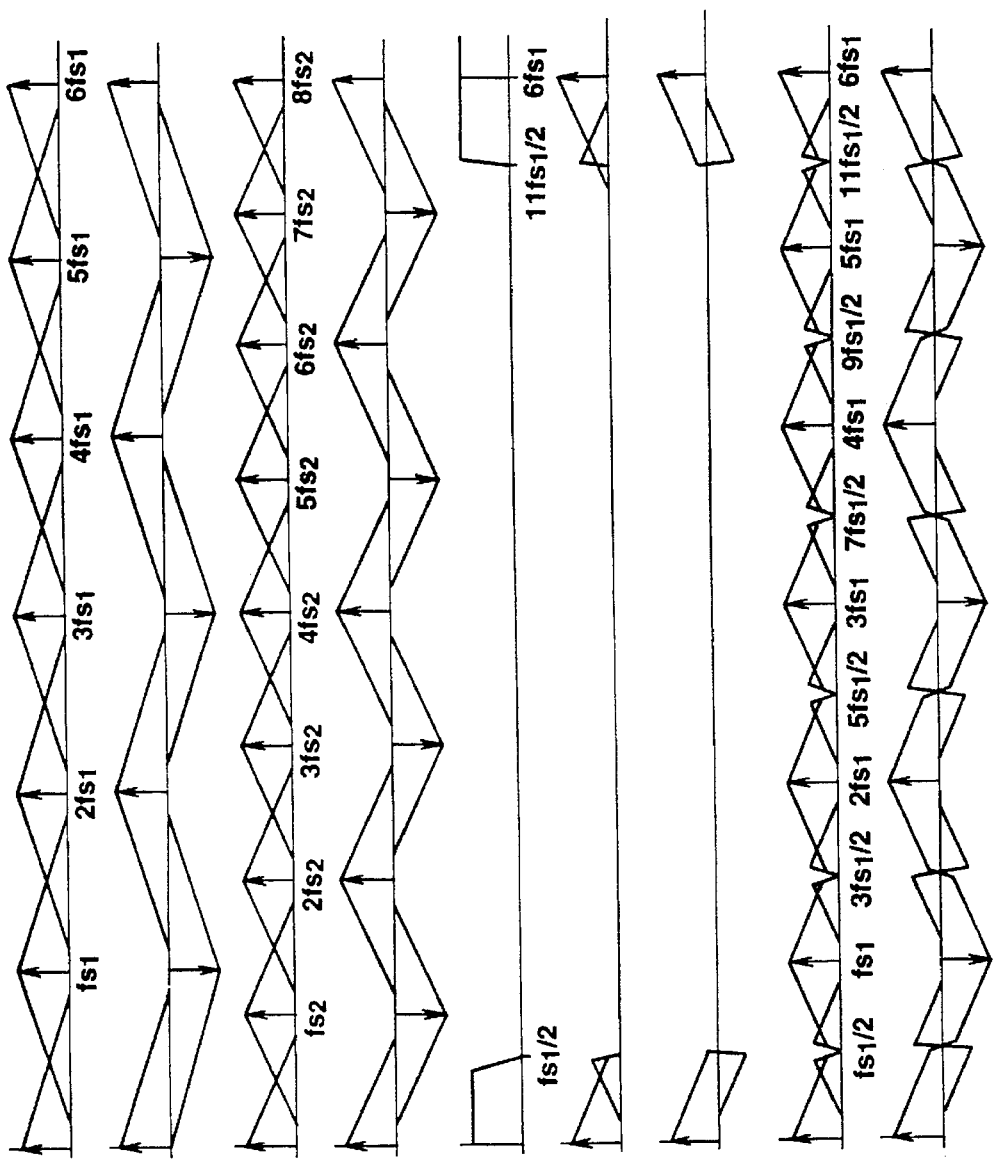

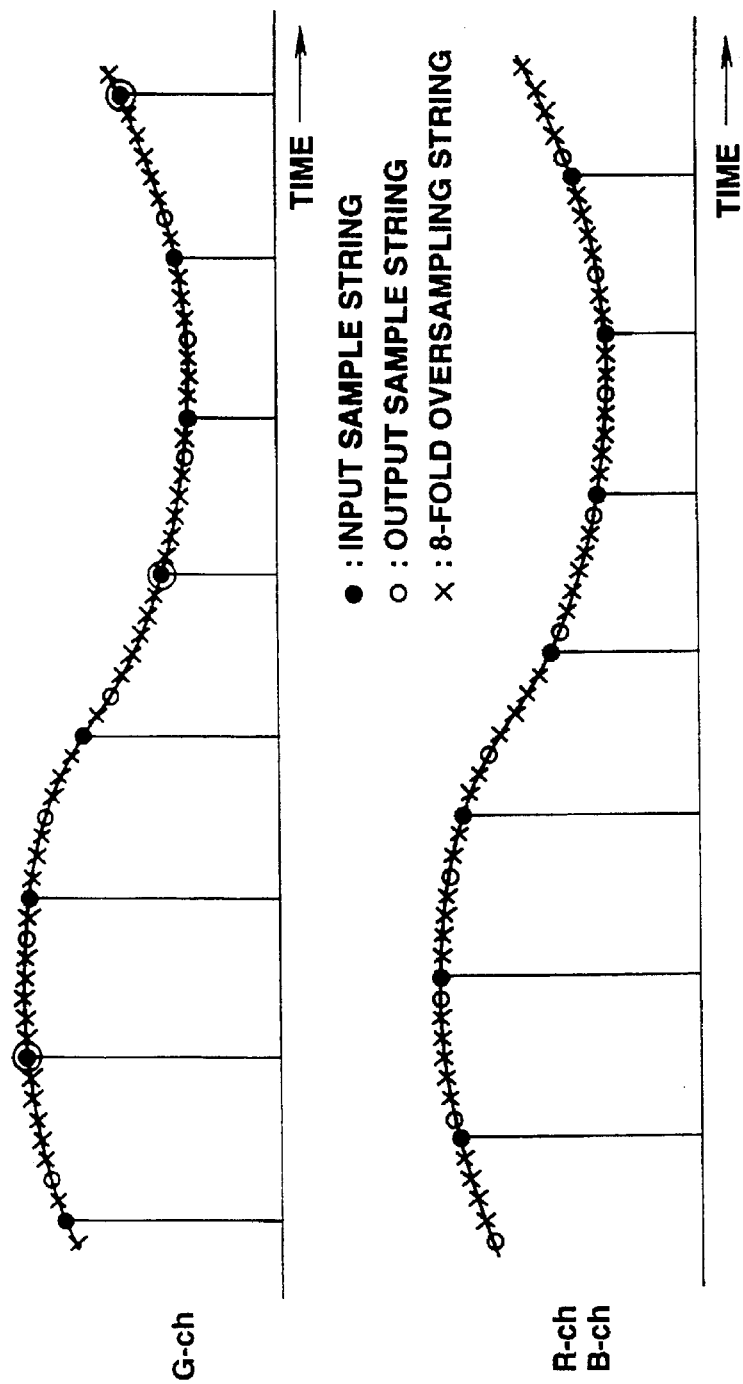

DIGITAL FILTER FOR PICTURE DATA AND DIGITAL FILTER SYSTEM

BACKGROUND OF THE INVENTION

This invention relates to a digital filter for picture data and a digital filter system.

In a digital signal processing system for picture processing, processing by a filter, in particular a low-pass filter, is executed frequently.

In sampling rate conversion, for example, input picture data is upsampled to a sampling frequency equal to a least common multiple between an input rate and an output rate and downsampled after bandwidth limitation by a low-pass filter for generating output data having a desired sampling frequency.

With a conventional digital filter adapted for processing picture data signals by a low-pass filter, ringing (overshoot) is increased if a flat band is to be increased in width, while the bandwidth is decreased if the ringing is to be reduced.

OBJECTS AND SUMMARY OF THE INVENTION

It is therefore an object of the present invention to provide a digital filter for picture data having a broad flat passband in which ringing can be suppressed effectively.

It is another object of the present invention to provide a digital filter for picture data whereby picture processing of picture data may be performed in a manner in which ringing (overshoot) can be suppressed effectively.

It is a further object of the present invention to provide a digital filter for color picture data having a broad flat band in which ringing can be suppressed effectively.

It is yet another object of the present invention to provide a digital filter system for color picture data whereby picture processing of color picture data may be performed in a manner in which ringing (overshoot) can be suppressed effectively.

In one aspect, the present invention provides a digital filter for picture data including a first low-pass filter having relatively steep cut-off characteristics for filtering input digital picture data, a second low-pass filter having relatively moderate cut-off characteristics for filtering the input digital picture data, mixing means for mixing digital picture data filtered by the first and second low-pass filters, step detecting means for detecting changes in step-like values of the input picture data, and control means for controlling the mixing ratio of the digital picture data from the first and second low-pass filters by the mixing means based on step detection outputs of the step detection means.

In another aspect, the present invention provides a digital filter for picture data including a first low-pass filter of relatively broad passband for filtering input digital picture data, a second low-pass filter of a relatively narrow bandwidth for filtering the input digital picture data, mixing means for mixing digital picture data filtered by the first and second low-pass filters, step detecting means for detecting changes in step-like values of the input picture data, and control means for controlling the mixing ratio of the digital picture data from the first and second low-pass filters by the mixing means based on step detection outputs of the step detection means.

In still another aspect, the present invention provides a digital filter system for picture data having a digital filter for each of input digital picture data of respective colors. Each digital filter has a first low-pass filter having relatively steep cut-off characteristics for filtering input digital picture data, a second low-pass filter having relatively moderate cut-off characteristics for filtering the input digital picture data, mixing means for mixing digital picture data filtered by the first and second low-pass filters, step detecting means for detecting changes in step-like values of the input picture data, and control means for controlling the mixing ratio of the digital picture data from the first and second low-pass filters by the mixing means based on step detection outputs of the step detection means.

In a further aspect, the present invention provides a digital filter system for picture data having a digital filter for each of input digital picture data of respective colors. Each digital filter has a first low-pass filter of relatively broad passband for filtering input digital picture data, a second low-pass filter of a relatively narrow passband for filtering the input digital picture data, mixing means for mixing digital picture data filtered by the first and second low-pass filters, step detecting means for detecting changes in step-like values of the input picture data, and control means for controlling the mixing ratio of the digital picture data from the first and second low-pass filters by the mixing means based on step detection outputs of the step detection means.

In yet another aspect, the present invention provides a digital filter system which, in addition to the above-described components, has concerting control means for controlling mixing means associated with input picture data of respective colors based on control data from the control means associated with input picture data of respective colors for providing a concerted mixing ratio of the digital picture data from the first and second low-pass filters.

The control means causes the digital picture data from the first and second low-pass filters by the mixing means to be gradually changed in the vicinity of a point at which the value of the input picture data is changed in a step shape.

The second low-pass filter is a register pre-mounted type FIR filter having a register in common with the first low-pass filter.

The step detection means is responsive to the degree of changes of the input picture data within a pre-set range of the vicinity of a pixel of the input picture under consideration data and to the degree of flatness of the value of the input picture data outside the pre-set range to derive the step detection output.

The step detection means includes level difference detection means for detecting the difference in the input picture data value at pixels within a pre-set range of vicinity of a pixel of the input picture data under consideration, flatness detecting means for detecting the degree of flatness of the values of the input picture data at pixels outside a pre-set range of vicinity of the pixel of said input picture data under consideration, and step detection output decision means for producing the step detection output responsive to an output of the level difference detection means and the flatness detection means.

The step detection output decision means outputs the difference of detection outputs of the level difference detection means and the flatness detection means as the step detection output.

The step detection output decision means outputs the ratio of detection outputs of the level difference detection means and the flatness detection means as the step detection output.

The flatness detection means detects the degree of flatness of the input picture data based upon the pixel of input picture data on the forward or rear side of the pre-set range of vicinity of the pixel under consideration having a higher luminance level value.

The concerting control means controls mixing means associated with input picture data of respective colors based on control data from the control means associated with the input picture data of respective colors for providing a concerted mixing ratio of the digital picture data from the first and second low-pass filters.

The concerting control means controls mixing means associated with input picture data of each color based upon control data outputted from control means associated with green-colored input picture data.

The concerting control means controls mixing means associated with input picture data of each color based upon control data outputted from control means associated with green-colored input picture data or control data outputted from control means associated with red-colored input picture data, whichever is larger.

The concerting control means controls mixing means associated with input picture data of each color based upon control data outputted from control means associated with green-colored input picture data or control data outputted from control means associated with red-colored input picture data, whichever is smaller.

With the above-described digital filter according to the present invention, input picture data supplied via a low-pass filter of a broader passband having steep cut-off characteristics and a low-pass filter of a narrower passband having moderate cut-off characteristics are mixed by mixing means of a variable mixing ratio for generating output picture data, and the mixing ratio of the mixing means is gradually changed in the vicinity of a step-like change of the input picture data based upon a step detection output of step detection means detecting step-like changes of the input picture data. In this manner, filter characteristics can be switched in such a manner as to render the boundary near the step less apparent, such that the input picture data can be processed by low-pass filter characteristics having a wide flat bandwidth and having ringing suppressed effectively. Thus the present invention provides a digital filter system for picture processing having a wide flat bandwidth and having ringing suppressed effectively.

The first and second low-pass filters may be configured as register-premounted type FIR filters having registers in common, thus achieving first low-pass filter characteristics of a wide passband having steep cut-off characteristics and second low-pass filter characteristics of a narrow passband having moderate cut-off characteristics.

With the digital filter system for picture processing according to the present invention, the step detecting means may have difference detection means for detecting the difference between a detection output of level difference detection means detecting the level difference at a pixel of the input picture data under consideration and a detection output of flatness detection means detecting the flatness at plural pixels in the vicinity of the pixel of the input picture data under consideration to provide a step detection output for detecting only an input step pattern for which the ringing tends to be apparent, so that there is no risk of the modulation transfer function (MTF) being lowered in input picture data in which ringing (overshoot) is hardly apparent, such as a striped picture pattern.

With the digital filter system for picture processing according to the present invention, the step detecting means may have ratio detection means for detecting the ratio between a detection output of level difference detection means detecting the level difference at a pixel of the input picture data under consideration and a detection output of flatness detection means detecting the flatness at plural pixels in the vicinity of the pixel of the input picture data under consideration to provide a step detection output for detecting only an input step pattern for which the ringing tends to be apparent so that there is no risk of the modulation transfer function (MTF) being lowered in input picture data in which ringing (overshoot) is hardly apparent, such as a striped picture pattern.

In addition, with the digital filter system for picture processing according to the present invention, picture data are processed by three color data based channels each having a first low-pass filter, a second low-pass filter, mixing means, step detection means and control means. The concerting control means concert the control operations of the three channels each causing the mixing ratio of the associated mixing means to be changed responsive to step detection outputs of the step detection means for assuring picture processing of color picture data in such a manner that ringing may be suppressed effectively.

BRIEF DESCRIPTION OF THE DRAWINGS

FIGS. 16(A)–16(I) schematically show, by signal spectrum, the operation in the frequency domain of an aspect ratio conversion unit in the digital processing camera.

FIGS. 17(A)–17(B) schematically show, by signal spectrum, the operation in the frequency domain of an aspect ratio conversion unit in the digital processing camera.

DESCRIPTION OF PREFERRED EMBODIMENTS

Figure 1:
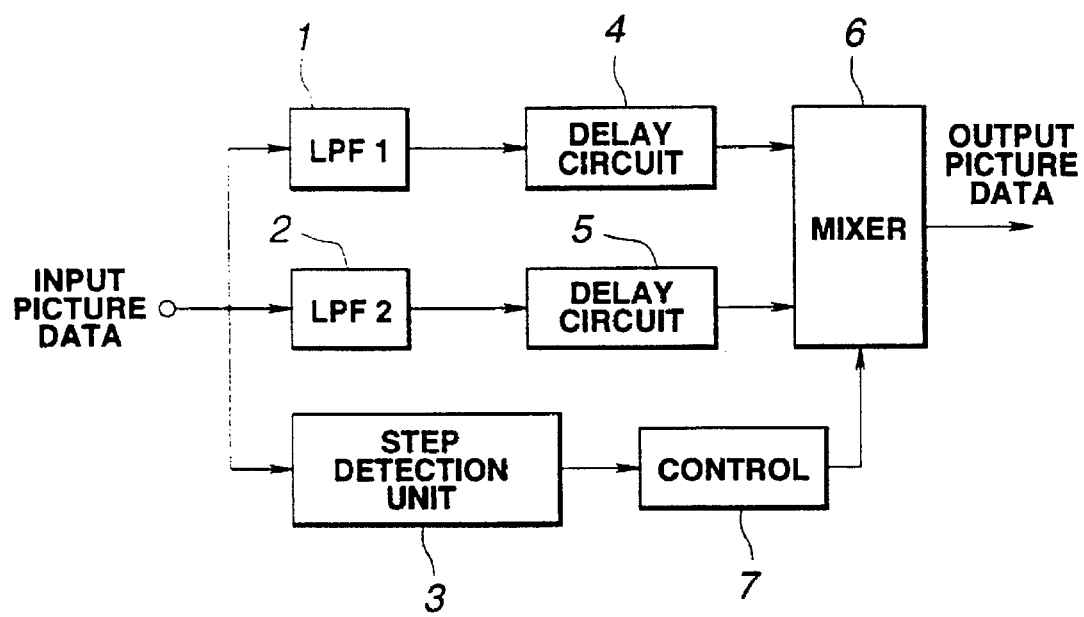
FIG. 1 is a block diagram showing an example of a digital filter for picture data according to the present invention.

Referring to the drawings, preferred embodiments of a digital filter for picture data and a digital filter system according to the present invention will be explained in detail.

Referring to FIG. 1, a digital filter for picture data according to the present invention includes a first low-pass filter 1, a second low-pass filter 2 and a step detector 3 respectively fed with input picture data. The digital filter also includes a mixer 6 fed with filter outputs of the first and second low-pass filters 1 and 2 via delay circuits 4 and 5, respectively, and a controller 7 fed with a step detection output of the step detector 3. The mixing ratio of the mixer 6 is controlled by the controller 7.

The first low-pass filter 1 is a broad-band low-pass filter having acute shut-off characteristics and is constituted by a FIR filter having a larger number of taps. The second low-pass filter 2 is a narrow-band low-pass filter having moderate shut-off characteristics and is constituted by a FIR filter having a smaller number of taps.

Figure 2:
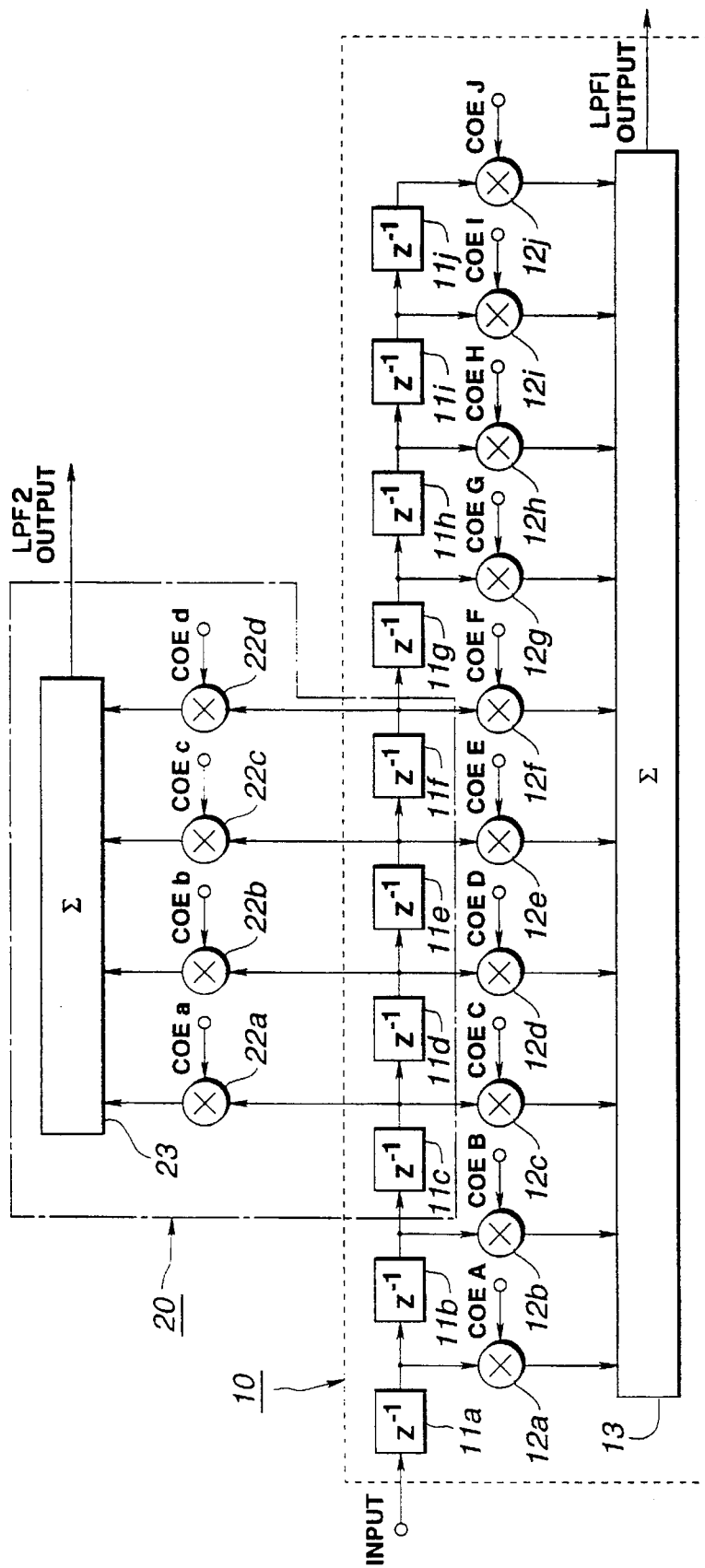
FIG. 2 is a block diagram showing an example of first and second low-pass filters constituting the digital filter.

Specifically, the first and second low-pass filters 1, 2 are register pre-mounted type FIR filters having four-stage registers 11c to 11f in common, as shown in FIG. 2.

Figure 3:
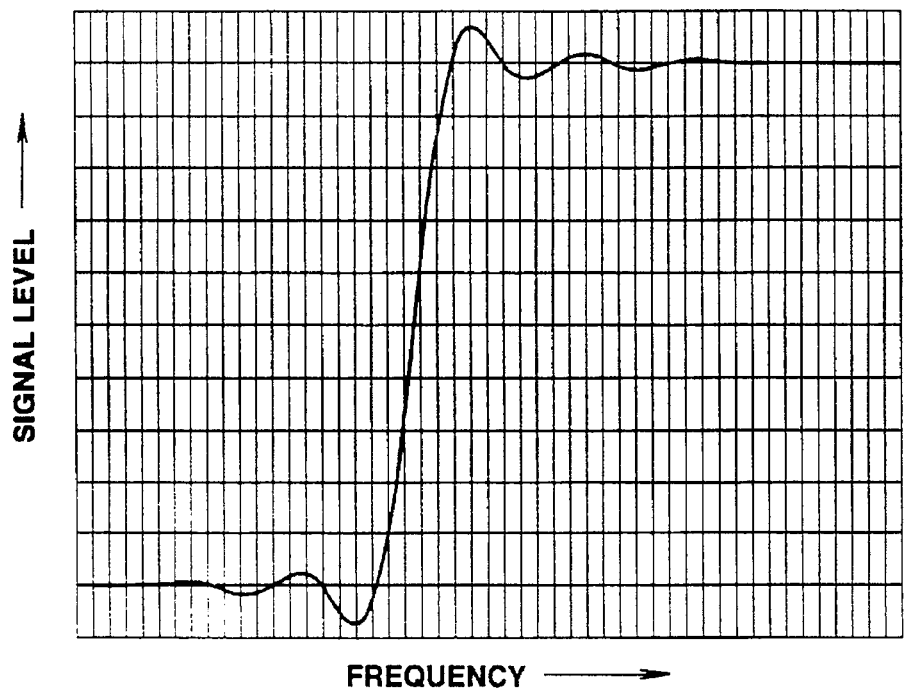
FIG. 3 is a graph showing typical low-pass filter characteristics of the first low-pass filter.

That is, the first low-pass filter 1 has 10-stage registers 11a to 11j connected in tandem, ten multipliers 12a to 12j for multiplying delay outputs of the registers 11a to 11j with filter coefficients COEF A to COEF J and an adder 13 for summing multiplication outputs of the multipliers 12a to 12j. The first low-pass filter 1, consisting in the 10-tap register-premounted FIR filter, has a broad-band low-pass filter characteristics having acute shut-off characteristics as step response characteristics shown for example in FIG. 3.

Figure 4:
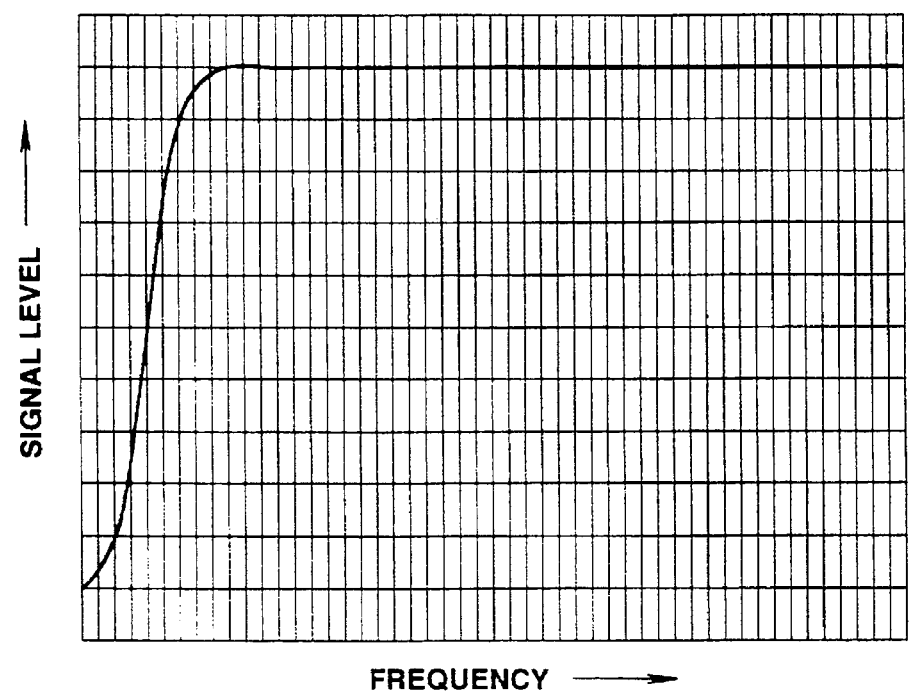
FIG. 4 is a graph showing typical low-pass filter characteristics of the second low-pass filter.

That is, the second low-pass filter 2 has 4-stage registers 11c to 11f connected in tandem, four multipliers 22a to 22d for multiplying delay outputs of the registers 11c to 11f with filter coefficients COEF a to COEF d and an adder 23 for summing multiplication outputs of the multipliers 22a to 22d. The second low-pass filter 2, consisting in the 4-tap register-premounted FIR filter, has a narrow-band low-pass filter characteristics having moderate shut-off characteristics as step response characteristics shown for example in FIG. 4.

Filter outputs of the first and second low-pass filters 1, 2 are fed to the mixer 6 after having their group delay characteristics compensated by delay circuits 4, 5, respectively, and having timing adjusted with respect to the step detector 3 and the controller 7.

Figure 5:
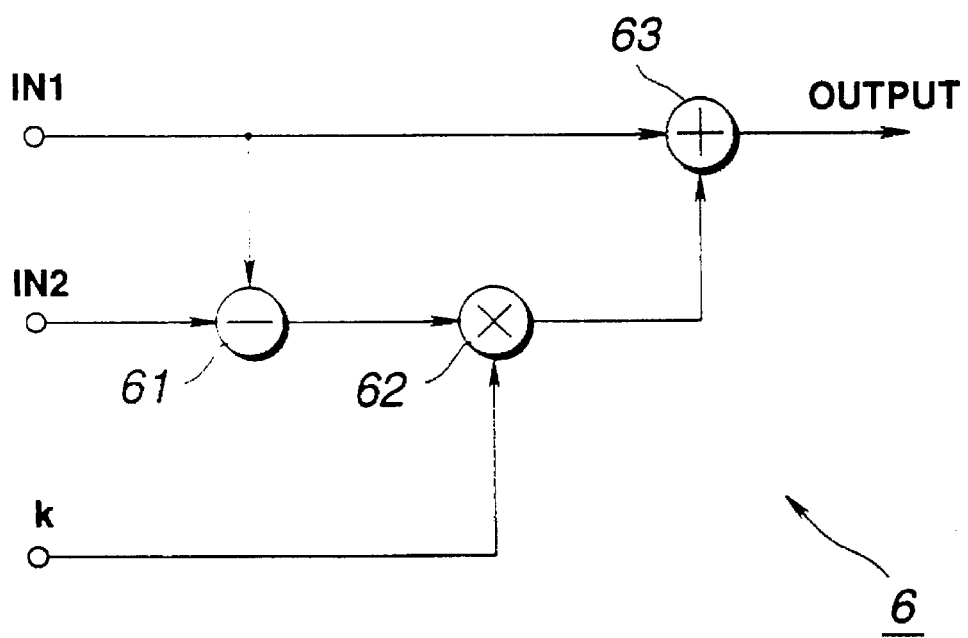
FIG. 5 is a block diagram showing an illustrative construction of a mixer constituting the digital filter.

The mixer 6 is mixing means with a variable mixing ratio for mixing input picture data supplied via the first and second low-pass filters 1 and 2 for generating output picture data, and is configured as shown in FIG. 5.

The mixer 6 shown in FIG. 5 is made up of a subtractor 61 for subtracting input picture data IN1, IN2 supplied via the first and second low-pass filters 1, 2, a multiplier 62 for multiplying a subtraction output of the subtractor 61 with a coefficient k and an adder 63 for adding an output of the multiplier 62 to the input picture data IN1 supplied via the first filter 1. The mixer 6 mixes the input picture data IN1, IN2 supplied via the first and second low-pass filters 1, 2 with a mixing ratio variably controlled by the coefficient k supplied to the multiplier 62 from the controller 7 for generating output picture data OUTPUT=(1−k)IN1+kIN2.

Figure 6A:
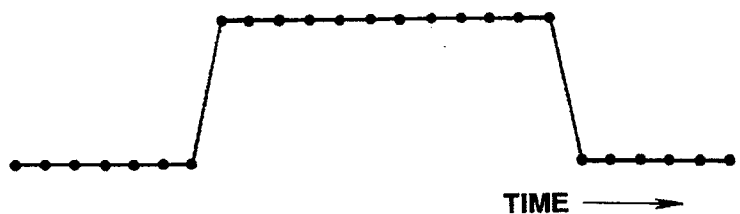
FIGS. 6(A)–6(D) are timing charts showing an illustrative operation of a step detection unit and a control unit constituting the digital filter.
Figure 6B:
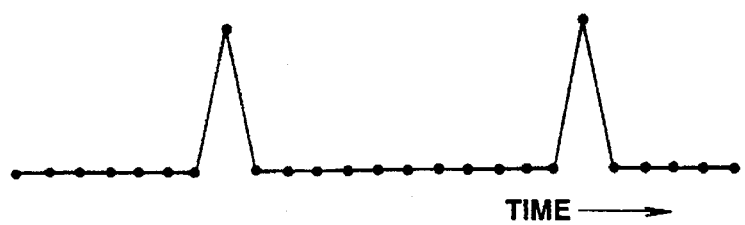

The step detector 3 detects step-like changes in the input picture data and is responsive to step-like changes in the input picture data shown in FIG. 6A to generate a step-shaped detection output as shown in FIG. 6B which is supplied to the controller 7.

Figure 7:
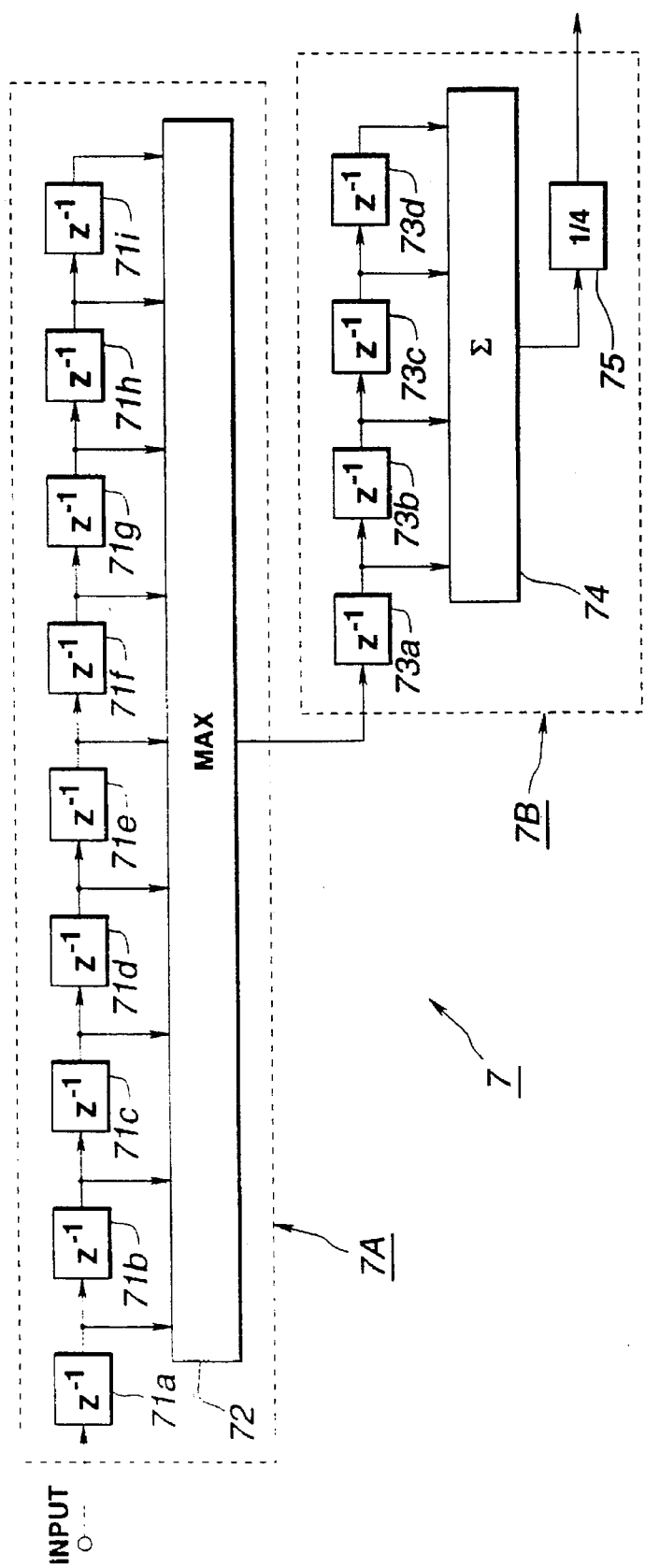
FIG. 7 is a block diagram showing an illustrative constitution of the controller.

The controller 7 causes the mixing ratio of the mixer stage to be changed gradually before and after step-like changes in the input picture data based upon a step detection output by the step detector 3, and is made up e.g., of an expander 7A and a low-pass filter 7B, as shown in FIG. 7.

Figure 6C:
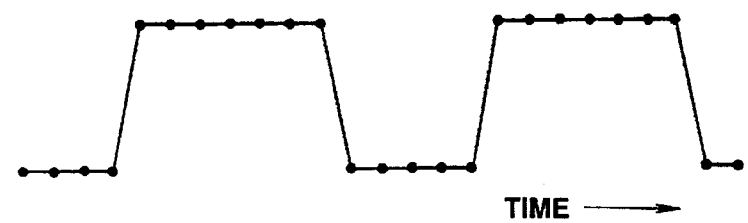

The expander 7A is made up of tandem-connected 9-stage registers 71a to 71i and a maximum value detection circuit 72 supplied with delay outputs of the registers 71a to 71i. The expander 7A detects the maximum value of delay outputs of the registers 71a to 71i, which are step detection outputs of the step detector 3 sequentially delayed by the registers 71a to 71i, by the maximum value detection circuit 72, for enlarging step detection outputs shown in FIG. 6B to the width of the pulse response of the first low-pass filter 1. This generates an expander output in which the maximum value of the delay outputs is maintained before and after the step-like changes of the input picture data, as shown in FIG. 6C.

Figure 6D:
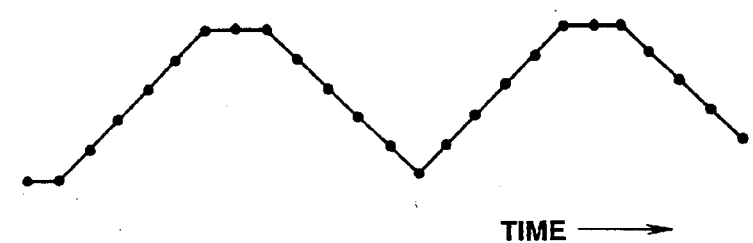

The low-pass filter 7B is a register pre-arranged type FIR filter made up of tandem-connected four-stage registers 73a to 73d, an adder 74 for summing delay outputs of the registers 73a to 73d and an attenuator 75 for attenuating the value of an addition output of the adder 74 by ¼. The low-pass filter 7B affords low-pass filter characteristics to an expander output of the expander 7A to generate a filter output having moderate rise and decay gradients as shown in FIG. 6D.

The above-described controller 7 applies the filter output to the multiplier 62 of the mixer 6 as the above-mentioned coefficient k for causing the mixing ratio of the mixer 6 to be gradually changed ahead and at back or in the vicinity of a step-like change of the input picture data based upon a step detection output by the step detector 3.

Thus it is possible with the digital filter for picture data according to the present invention to change over filter characteristics so that the boundary is not apparent in the vicinity of the step-like change by mixing input picture data supplied via the first low-pass filter of a broad passband having steep cut-off characteristics and the second high-pass filter of a narrow bandwidth having moderate cut-off characteristics by the mixer 6 having a variable mixing ratio for generating output picture data and by gradually changing the mixing ratio of the mixer 6 ahead and at back of the step-like change of the input picture data based upon the step-shaped change in the input picture data under control by the controller 7. This enables the input picture data to be processed in accordance with low-pass filter characteristics in which a flat band is of a broad bandwidth and ringing is suppressed effectively.

Although the mixing ratio of the mixer 6 is changed gradually, this is not limitative of the present invention. Thus the mixer 6 may be constituted by a selector whereby one of the input picture data from the first low-pass filter 1 and the input picture data from the second low-pass filter 2 will be outputted selectively. That is, the mixing ratio may be changed instantaneously from 1:0 to 0:1 or vice versa.

It is noted that, in the step detection unit 3, step-like changes can be detected as a principle by the level difference of the respective pixels of the input picture data. However, if only input step patterns are detected for which the ringing tends to be apparent, there is no risk of the modulation transfer function (MTF) being lowered in input picture data in which ringing (overshoot) is hardly apparent, such as a striped picture pattern.

Figure 8:
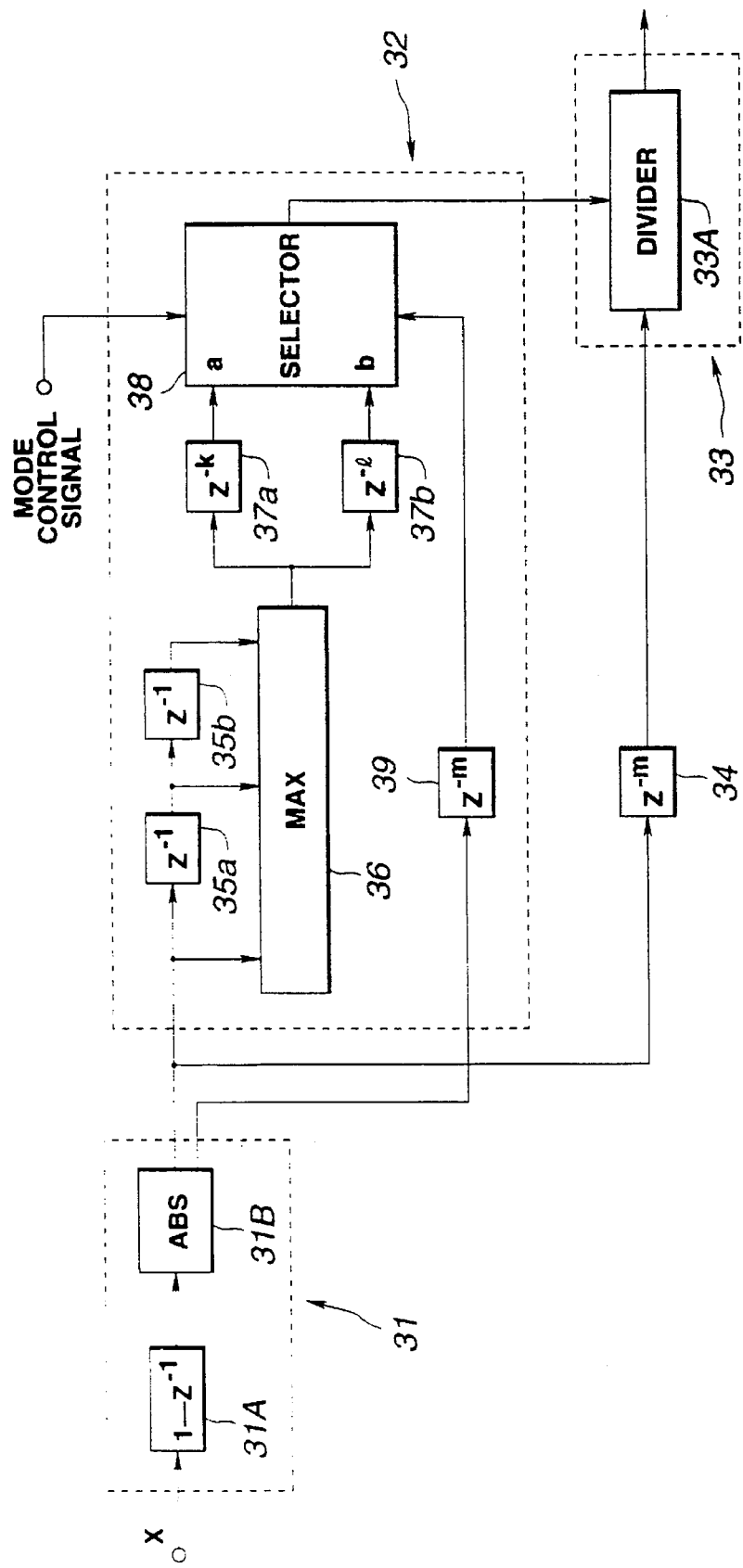
FIG. 8 is a block diagram showing an illustrative constitution of the step detection unit.

The step detector 3 may be configured as shown for example in FIG. 8.

The step detector 3 shown in FIG. 8 is made up of a level difference detecting section 31 supplied with input picture data X, a flatness detecting section 32 supplied with a detection output of the level difference detecting section 31 and an evaluating section 33 supplied with detection outputs of the level difference detecting section 31 and the flatness detecting section 32.

The level difference detecting section 31 is made up of a difference detector 31A for detecting the level difference between neighboring pixels of the input picture data X, and an absolute value detector 31B for detecting the absolute value of a difference detection output of the difference detector 31A. The level difference detecting section 31 detects the level difference between neighboring pixels of the input picture data X and routes an absolute value of the level difference and the sign indicating the polarity thereof to the flatness detecting section 32 while routing the absolute value of the level difference via a delay element 34 to the evaluating section 33.

The flatness detecting section 32 includes a maximum value detector 36, fed with the absolute value of the level difference between the neighboring pixels from the level difference detecting section 31 directly and via delay elements 35a, 35b, and a selecting section 38 fed with a detection output of the maximum value detector 36 via delay elements 37a, 37b. The selector 38 is fed via a delay element 39 with a sign indicating the polarity of the level difference between neighboring pixels obtained by the level difference detecting section 31.

The delay quantities of the delay elements 35a, 35b, 37a, 37b, 39 of the flatness detecting section 32 are set as follows. That is, the delay quantities of the delay elements 35a, 35b are a delay quantity Z-1 corresponding to a one-pixel interval. The delay quantity Z-k of the delay element 37a is the delay quantity Z-7 corresponding to a 7-pixel interval, while the delay quantity Z-1 of the delay element 37b is the delay quantity Z-1 corresponding to a 1-pixel interval. The delay quantity Z-m of the delay element 39 is the delay quantity Z-4 corresponding to a 4-pixel interval.

Figure 9:
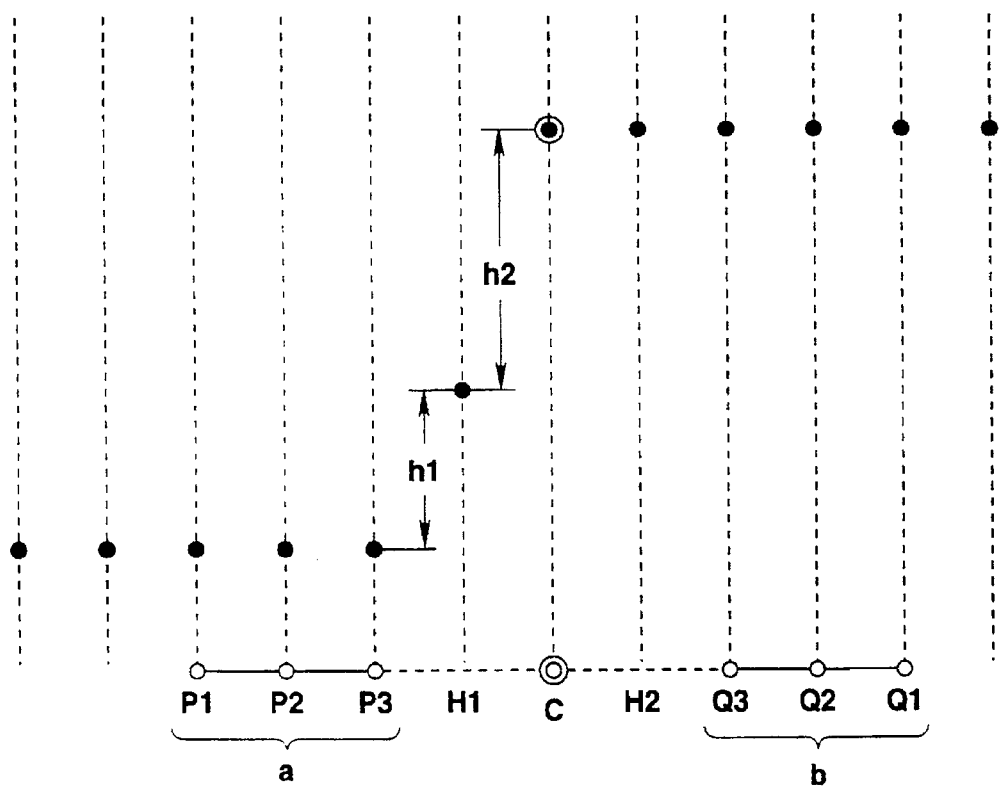
FIG. 9 illustrates an illustrative operation of a maximum value detector constituting the step detection unit.

The maximum value detector 36 detects the maximum value of the difference between the absolute values of the level differences of three neighboring pixels. The maximum value detector 36 detects the maximum value of the difference between the absolute values of three pixels P1, P2 and P3 on the forward side of a pixel H1 next to a pixel under consideration C disposed at a picture edge as shown in FIG. 9 and routes a detection output via the delay element 37a to the selector 38. In addition, the maximum value detector 36 detects the maximum value of the difference between the absolute values of three pixels Q1, Q2 and Q3 on the backward side of a pixel H2 next to the pixel under consideration C disposed at a picture edge as shown in FIG. 9, and routes a detection output via the delay element 37a to the selecting section 38.

Figure 10:
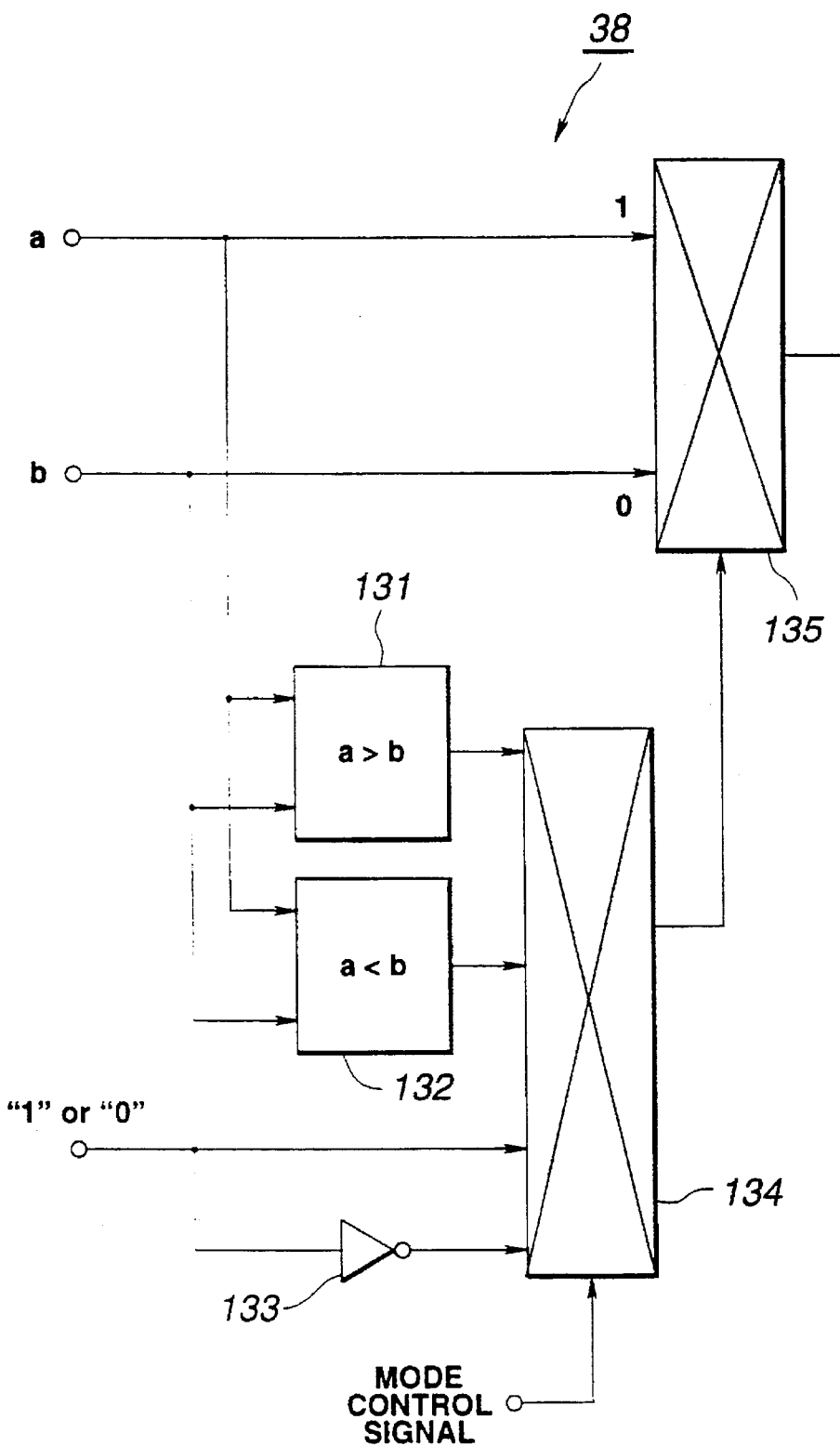
FIG. 10 is a block diagram showing an illustrative construction of a selector constituting the step detection unit.

The selecting section 38 is made up of first and second comparators 131, 132, an invertor 133, a selecting controller 134 and a selector 135, as shown in FIG. 10.

The first and second comparators 131, 132 of the selecting section 38 compare detection outputs a, b of the maximum value detector 36 supplied via the delay elements 37a, 37b. The first comparator 131 routes a comparison output indicating the relation a>b by a logical value "1" to the selector controller 134. The second comparator 132 routes a comparison output indicating the relation a<b by a logical value "1" to the selector controller 134.

In addition, the selector controller 134 is directly fed with the sign supplied from the level difference detecting section 31 via the delay element 39 as a signal indicating the decay edge from the white region to the black region of the picture by a logical level "1", while being fed via an inverter 133 with the sign indicating the rising edge from the black region to the white region of the picture by a logical level "1".

The sign produced at the level difference detecting section 31 specifies the polarity of the level difference between neighboring pixels. Thus the positive and negative polarities are specified by logical levels "1" and "0", respectively. That is, the sign is minus (negative) at a rising edge from the black region to the white region of the picture and specified by the logical level "0" and becomes plus (positive) at a falling edge from the white region to the black region of the picture and specified by the logical level "1".

When fed with a selector control signal of the logical level "1" from the selector controller 134, the selector 135 selects an output of the delay element 37a, that is the detection output a of the maximum value detecting section 36 and, when fed with a selector control signal of the logical level "0" from the selector controller 134, the selector 135 selects an output of the delay element 37b, that is the detection output b of the maximum value detecting section 36 on the forward side of the pixel under consideration C.

The selector 134 controls the selector 135, based upon the respective comparison outputs and signals indicating the white and black portions of the picture, for selecting one of the detection outputs of the maximum value detecting sections 36 supplied via the delay elements 37a, 37b as the information specifying the flatness in the vicinity of the pixel under consideration C. In the present embodiment, the following four sorts of the mode are specified by the mode control signal selected by the user.

That is, if the first mode is specified by the above mode control signal, the selector control section 134 selects the comparison output of the first comparator 131 as the selector control signal and accordingly controls the selector 135. If the comparison output of the first comparator 131 is used in this manner as the selector control signal, and if the relation between the detection outputs a and b of the maximum value detecting section 36, supplied via the delay elements 37a, 37b, is a>b, the selector control signal is of the logical level "1", so that the detection output a, that is the detection output exhibiting a larger transition value, is selected by the selector 135. If the relation between the detection outputs a, b of the maximum value detecting section 36 is a<b, the selector control signal is of the logical level "0", so that the detection output b, that is the detection output exhibiting a larger transition value, is selected by the selector 135.

Thus, with the first mode, one of the detection outputs for the leading and trailing sides of the pixel under consideration C, exhibiting a value of a larger transition, is selected as the information indicating the flatness in the vicinity of the pixel under consideration C.

If the second mode is specified by the above mode control signal, the selector control section 134 selects the comparison output of the second comparator 132 as the selector control signal and accordingly controls the selector 135. If the comparison output of the second comparator 132 is used in this manner as the selector control signal, and if the relation between the detection outputs a, b of the maximum value detecting section 36, supplied via the delay elements 37a, 37b, is a<b, the selector control signal is of the logical level "1", so that the detection output a, that is the detection output exhibiting a smaller transition value, is selected by the selector 135. If the relation between the detection outputs a, b of the maximum value detecting section 36 is a>b, the selector control signal is of the logical level "0", so that the detection output b, that is the detection output exhibiting a smaller transition value, is selected by the selector 135.

Thus, with the second mode, one of the detection outputs for the leading and trailing sides of the pixel under consideration C, exhibiting a value of a smaller transition, is selected as the information indicating the flatness in the vicinity of the pixel under consideration C.

If the third mode is selected by the mode control signal, a signal indicating the rising edge from the black region to the white region of the picture by the logical level "1" is selected, based upon the sign inverted by the invertor 133, and accordingly controls the selector based upon this selected signal. By using the signal specifying the rising edge from the black region to the white region of the picture by the logical "1" as the selector control signal, the selector control signal becomes logical "1" at the rising edge from the black region to the white region of the picture. Thus the detection output a by the maximum value detection section 36, supplied via the delay element 37a, that is the detection output for the leading side black region of the pixel under consideration C, is selected by the selector 135. On the other hand, the selector control signal becomes logical "0" at the falling edge from the white region to the black region of the picture, so that the detection output b by the maximum value detection section 36, supplied via the delay element 37b, that is the detection output for the trailing side black region of the pixel under consideration C, is selected by the selector 135 as the information specifying the flatness in the vicinity of the pixel under consideration C.

Thus, with the third mode, the detection outputs for the leading or trailing side of the pixel under consideration C, is selected as the information indicating the flatness in the vicinity of the pixel under consideration C.

If the fourth mode is selected by the mode control signal, a signal indicating the falling edge from the white region to the black region of the picture by the logical level "1" is selected, based upon the sign directly supplied from the delay element 39, and accordingly controls the select 135 based upon this selected signal. By using the signal specifying the falling edge from the white region to the black region of the picture by the logical "1" as the selector control signal, the selector control signal becomes logical "1" at the falling edge from the white region to the black region of the picture. Thus the detection output a by the maximum value detection section 36, supplied via the delay element 37a, that is the detection output for the leading side white region of the pixel under consideration C, is selected by the selector 135. On the other hand, the selector control signal becomes logical "0" at the rising edge from the black region to the white region of the picture, so that the detection output b by the maximum value detection section 36, supplied via the delay element 37b, that is the detection output for the trailing side white region of the pixel under consideration C, is selected by the selector 135.

Thus, with the fourth mode, the detection output for the leading or trailing side of the pixel under consideration C, is selected as the information indicating the flatness in the vicinity of the pixel under consideration C.

In this manner, one of the detection outputs by the maximum value detection section 36, supplied via the delay elements 37a, 37b is selected, responsive to the first to fourth modes, as the information specifying the signal flatness in the vicinity of the pixel under consideration C. If the detection output selected for the prevailing mode is that between the neighboring pixels in the flat portions on the forward or rear side of the pixel under consideration disposed at a picture edge, the level difference between the neighboring pixels in the flat portion is small, so that the value of the selected detection output also becomes small.

That is, with the first mode, the detection output for the regions on the forward or rear side of the pixel under consideration C, whichever exhibits a larger transition value, is selected by the selecting section 38 as the information specifying the flatness in the vicinity of the pixel under consideration C disposed at a picture edge. Thus the detection output is of a small value if both the forward and rear sides of the pixel under consideration C are flat regions. With the second mode, since the detection output for the regions on the forward or rear side of the pixel under consideration C, whichever exhibits a smaller transition value, is selected by the selecting section 38 as the information specifying the flatness in the vicinity of the pixel under consideration C disposed at a picture edge, the detection output is of a small value if at least one of the forward and the rear sides of the pixel under consideration C is of a smaller value. With the third mode, since the detection output for the black region on the forward or rear side of the pixel under consideration C is selected by the selecting section 38 as the information specifying the flatness in the vicinity of the pixel under consideration C, the detection output is of a small value if the black region is a flat region. With the fourth mode, since the detection output for the white region on the forward or rear side of the pixel under consideration C, is selected by the selecting section 38 as the information specifying the flatness in the vicinity of the pixel under consideration C, the detection output is of a small value if the white region is a flat region.

The evaluating section has a divider 33A which divides the absolute value of the difference, supplied via the delay element 34, by a detection output of the selecting section 38. Thus the evaluating section 33 outputs a step detection output which is relative evaluation of the step width in the vicinity of the pixel under consideration C and level difference in the surrounding region. That is, the larger the step width or edge in the vicinity of the pixel under consideration C and hence the more likely the occurrence of ringing (overshoot), the larger becomes the absolute value of the level difference supplied via the delay element 34, thus increasing the value of a step detection output by the evaluating section 33. On the other hand, the smaller the level difference in the vicinity of the pixel under consideration C and the more apparent the ringing (overshoot), the smaller becomes the value of the detection output of the selection section 38, thus increasing the value of the coefficient output k obtained as a step detection output generated by the controller.

The three pixels on the forward and rear sides of the pixel under consideration with each one pixel in-between are adopted as the surrounding evaluating region because a transition h1 between the pixels P3 and H1 would be evaluated as the surrounding level difference if the three pixels P2, P3 and H1 were adopted as the region of evaluation without interposing one pixel on either side of the pixel under consideration C in the input string shown in FIG. 1.

Although the forward and rear three pixels are evaluated in the step detecting unit 3 using the three-tap maximum value detecting section 36, the number of taps of the maximum value detecting section 36 may be modified depending upon the step response length.

By changing over from the forward side to the rear side of the edge or vice versa depending upon the polarity of the detection output by the difference detector 31A of the level difference detecting section 31, the black side or the white side may be evaluated without regard to the edge polarity. If the low-pass filter is used ahead of gamma correction, ringing (overshoot) becomes outstanding on the black side, so that it is more desirable to make preferential evaluation of the flatness of the black side.

Figure 11:
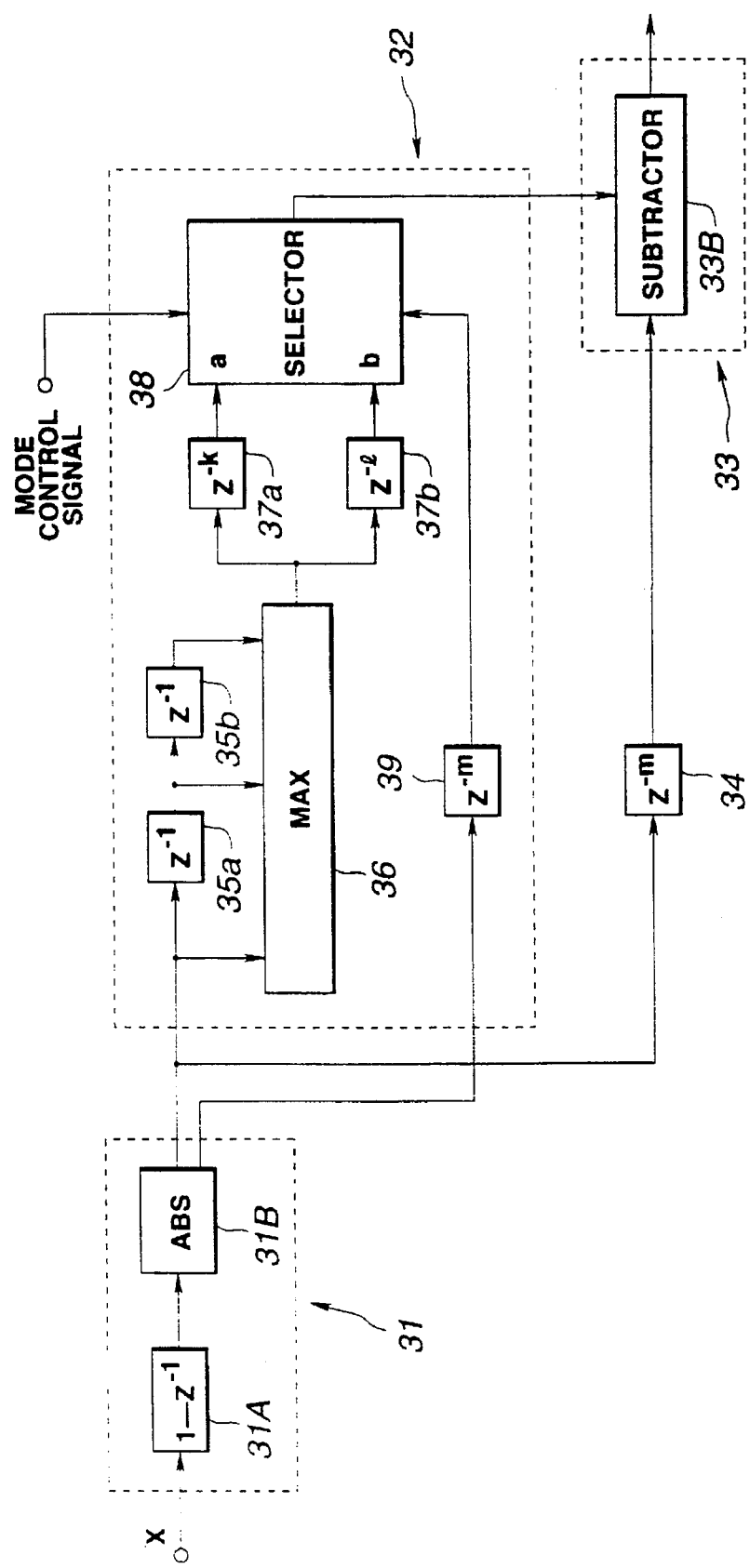
FIG. 11 is a block diagram showing another illustrative construction of the step detection unit.

Although the step detecting unit 3 performs relative evaluation using the divider 33A as the evaluating section 33, substantially the same results may be accrued by employing a subtractor 33B in place of the divider 33A as shown for example in FIG. 11. The subtractor 33B may be made up of a smaller number of elements than the divider 33A and may be increased in its processing speed.

Figure 12:
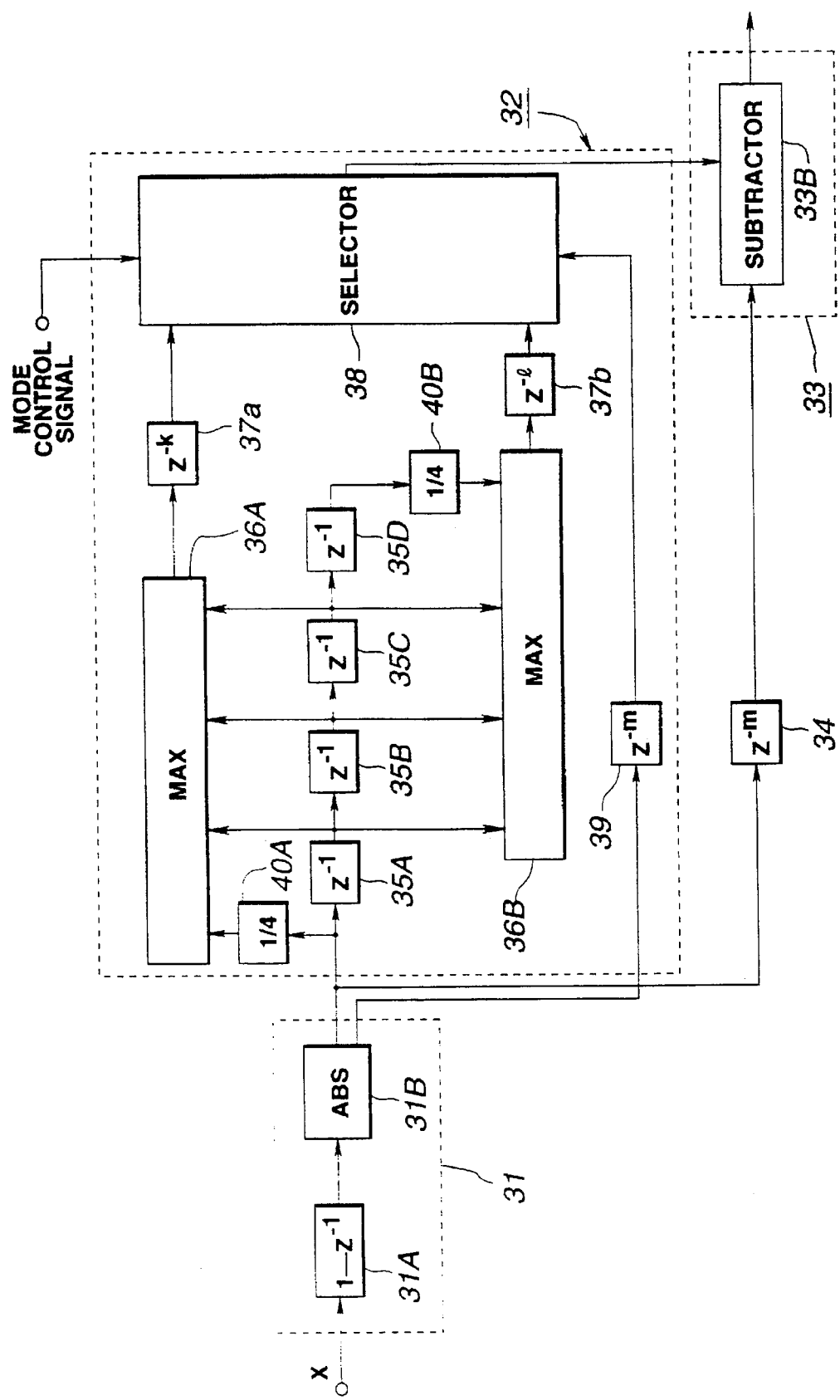
FIG. 12 is a block diagram showing still another illustrative construction of the step detection unit.

The flatness detecting section 32 of the step detecting unit may be configured for evaluating forward and rear four pixels of the pixel under consideration C disposed at the picture edge by the four-tap maximum value detectors 36A, 36B, as shown in FIG. 12. The filter switching state can be rendered less apparent by modifying the weighting to the respective taps by weighting elements 40A, 40B for thereby smoothing the transition of the evaluation values. It will be noted that the modified flatness detecting section of FIG. 12 includes four delay elements (Z-1) 35A–35D instead of two delay elements associated with the maximum value detectors 36A, B of FIG. 12.

Figure 13:
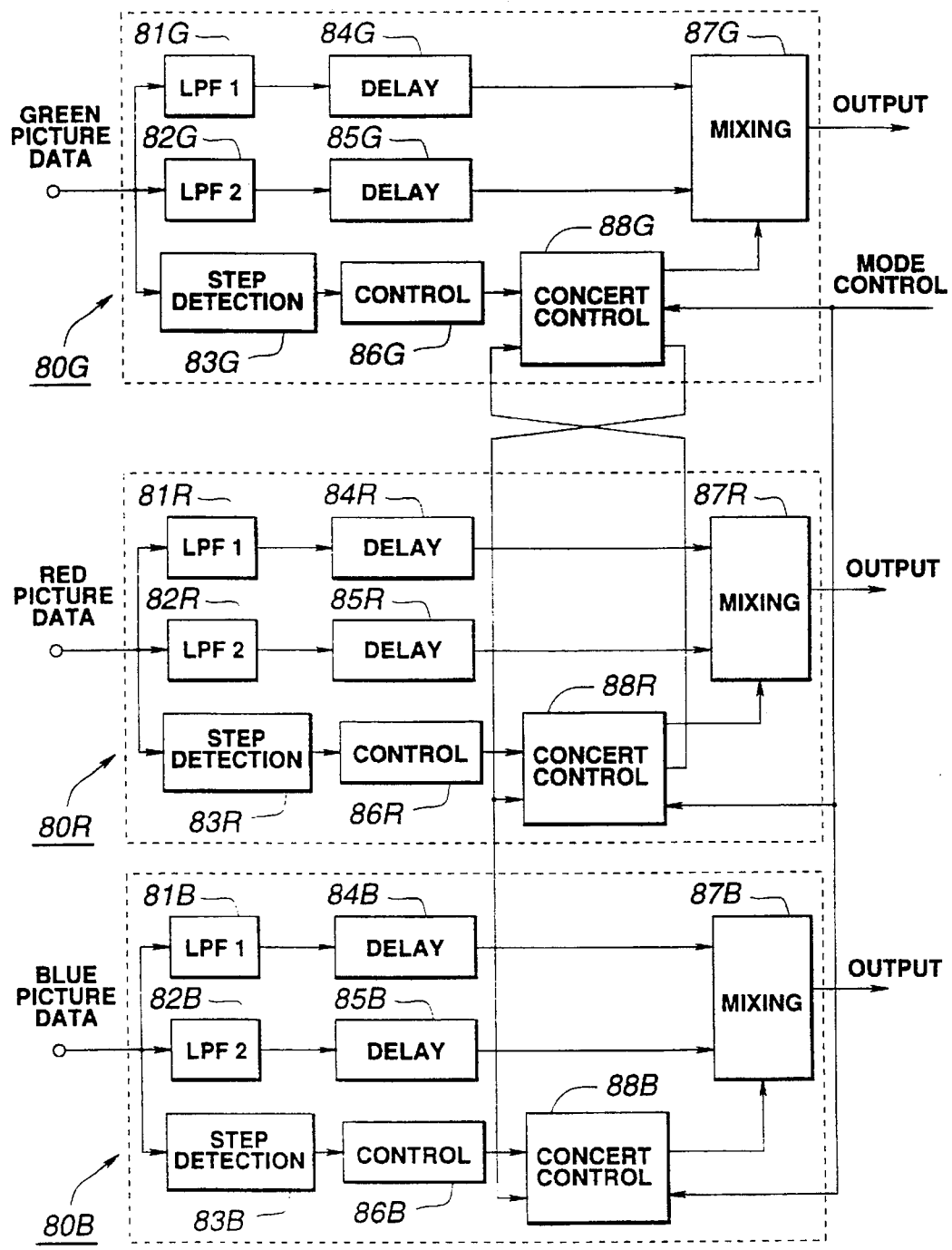
FIG. 13 is a block diagram showing an illustrative construction of a rate converting filter for color picture processing constituted by a digital filter for picture processing according to the present invention.

The digital filter system for picture data according to the present invention is configured as shown in FIG. 13. The digital filter system for picture data shown in FIG. 13 includes rate converting filters 80R, 80G and 80B, according to color data sorts, for handling color picture data.

The rate converting filter 80R, handling red color picture data, is made up of a first low-pass filter 81R, a second low-pass filter 82R and a step detecting section 83R, supplied with red color picture data, a mixer 87R supplied with filter outputs of the first and second low-pass filters 81R and 82R via delay circuits 84R and 85R, respectively, a controller 86R fed with a step detection output of the step detecting section 83R and a negotiating controller 88R fed with an output of the controller 86R. The mixing ratio of the mixer 87R is controlled by the negotiating controller 88R.

The rate converting filter 80G, handling green color picture data, is made up of a first low-pass filter 81G, supplied with green-colored picture data, a second low-pass filter 82G and a step detecting section 83G, supplied with green color picture data, a mixer 87G supplied with filter outputs of the first and second low-pass filters 81G and 82G via delay circuits 84G and 85G, respectively, a controller 86G fed with a step detection output of the step detecting section 83G and a negotiating controller 88G fed with an output of the controller 86G. The mixing ratio of the mixer 87R is controlled by the negotiating controller 88G.

The rate converting filter 80B, handling blue color picture data, is made up of a first low-pass filter 81B, a second low-pass filter 82B and a step detecting section 83B, supplied with red color picture data, a mixer 87B supplied with filter outputs of the first and second low-pass filters 81B and 82B via delay circuits 84B and 85B, respectively, a controller 86B fed with a step detection output of the step detecting section 83B and a negotiating controller 88B fed with an output of the controller 86B. The mixing ratio of the mixer 87B is controlled by the negotiating controller 88B.

The first low-pass filter and the second low-pass filters 81R, 82R are configured as shown for example in FIG. 2. Thus, the first low-pass filter 81R has broad-range low-pass filter characteristics having steep cut-off characteristics, while the second low-pass filter 82R has narrow-range low-pass filter characteristics having moderate cut-off characteristics. As for the low-pass filters 81G, 81B and the second low-pass filters 2G, 82B, the first low-pass filters 81G, 81B have broad-range low-pass filter characteristics having steep cut-off characteristics, while the second low-pass filters 82G, 82B have narrow-range low-pass filter characteristics having moderate cut-off characteristics.

The mixer 87R is a mixing circuit having a variable mixing ratio by the configuration shown for example in FIG. 5 and mixes input red-colored picture data supplied via the first and second low-pass filters 81R, 82R for generating output red-colored picture data. Similarly, the mixers 87G and 87B are mixing circuits each having a variable mixing ratio by the configuration shown for example in FIG. 5 and mix input red-colored picture data supplied via the first and second low-pass filters 81G, 81B and 82G, 82B for generating output color picture data.

On the other hand, the step detecting sections 83R, 83G and 83B are each a circuit for detecting step-like changes in the input color picture data and, by the configuration shown in FIG. 12, derive step detection outputs representing relative evaluation of the step widths and ambient level difference at the pixel under consideration to transmit respective step detection outputs to the controllers 86R, 86G and 86B.

The controllers 86R, 86G and 86B are of the configuration shown for example in FIG. 7 and are responsive to the results of evaluation of step-shaped transitions indicated by step detection outputs by the step detection sections 83R, 83G and 83B to derive control outputs of gradually changing the mixing ratio ahead and at back of step-like changes of the input picture data in order transmit the control outputs to the negotiating controllers 88R, 88G and 88B.

Each of the negotiating controllers 88R, 88G and 88B has an input/output function of the results of negotiation and determines a concerting value MIXOUT proper to it from a control value derived from an associated one of the controller 86R, 86G and 86B of different channels and a concerting value MIXIN derived from the negotiating controller of an other channel in order in order to transmit the concerting value to the negotiating controller of the other channel and in order to control the mixing ratio of the mixers 87R, 87G and 87B, using the concerted values MIX OUT as the coefficient k.

It is noted that, since the blue picture data is lower in S/N ratio than the green or red picture data, the concerted value obtained by the negotiating controller 88G for the green picture data is supplied to the remaining two negotiating controllers 88R, 88B, while the concerted value obtained by the negotiating controller 88R for the red picture data is supplied only to the negotiating controllers 88G for the green color picture data and the concerted value derived from the negotiating controller 88R for blue picture data is not employed.

Figure 14:
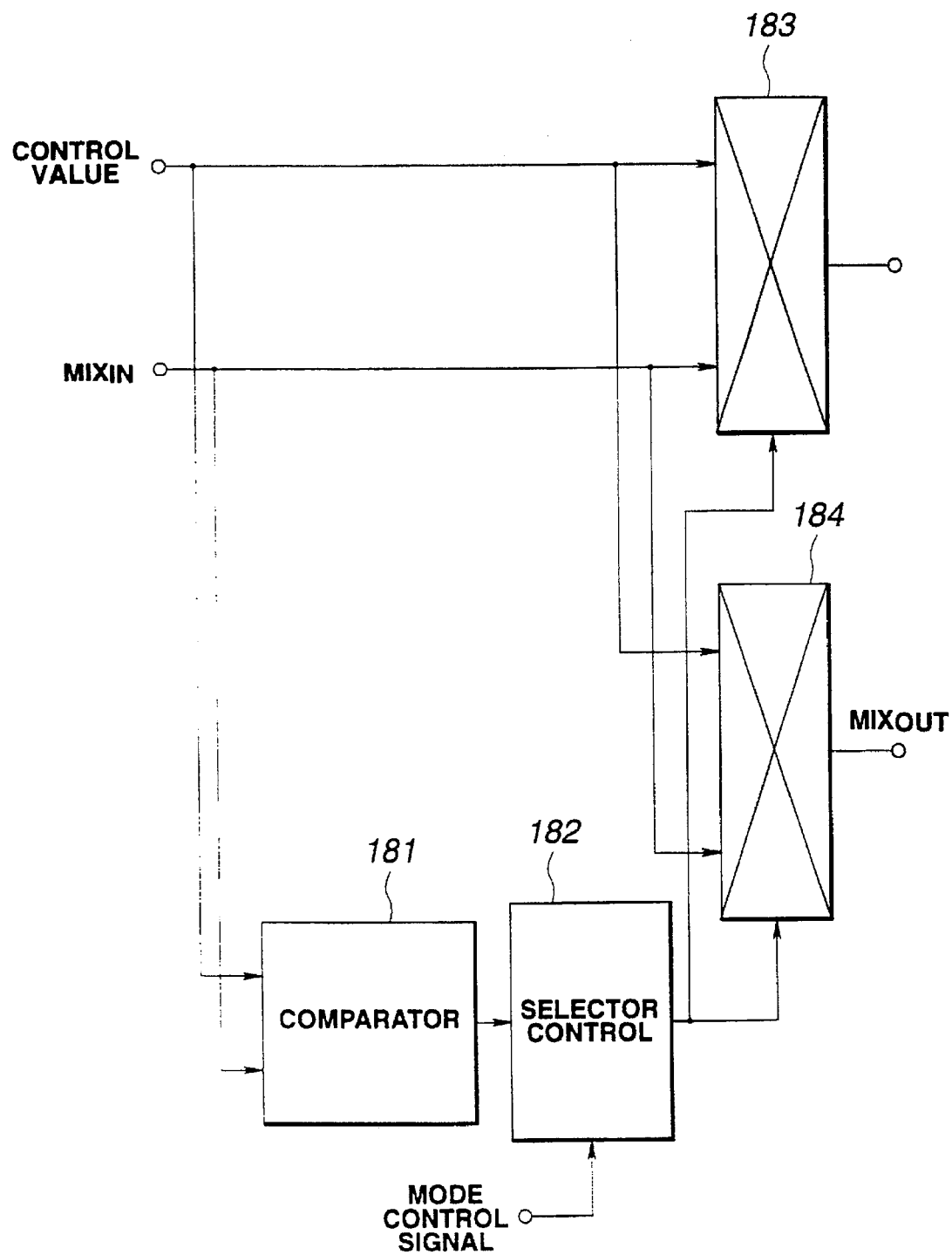
FIG. 14 is a block circuit diagram showing an illustrative example of a concert control unit in the rate converting filter.

The negotiating controllers 88R, 88G and 88B are each made up of a comparator 181, a selecting control section 182 and selectors 183, 184, as shown in FIG. 14.

The comparator 181 of each of the negotiating controllers 88R, 88G and 88B compares the magnitude of the control value derived from an associated one of the controllers 86R, 86G and 86R of the respective channels and routes the comparison output to the selector controller 182. The inverting controller 182 is responsive to the mode control signal to control the selectors 183, 184 to selectively output the control values derived from the controllers 86R, 86G and 86B of the respective channels and the concerted value MIXIN derived from the negotiating controllers of the different channels from the selectors 183 and 184.

Four operating modes can be set for the negotiating controllers 88R, 88G and 88B by the mode control signal.

For the first mode, the negotiating controller 88G for green picture data controls the selectors 183, 184 for outputting the control value derived from the controller 86G of the associated channel, while the remaining negotiating controllers 88R, 88B control the selectors 183, 184 for outputting the control value MIXIN derived from the negotiating controller of the other channel, that is the negotiating controller 88G for the green picture data. In this manner, for the G master mode as the first mode, the mixing ratio for the entire channels is controlled by the control value derived from the controller 86G for green picture data.

For the second mode, the negotiating controller 88R for green picture data controls the selectors 183, 184 for outputting the control value derived from the controller 86R of the associated channel, while the remaining negotiating controllers 88G, 88B control the selectors 183, 184 for outputting the control value MIXIN derived from the negotiating controller of the other channel, that is the negotiating controller 88R for the green picture data. In this manner, for the R master mode as the second mode, the mixing ratio for the entire channels is controlled by the control value derived from the controller 86R for red picture data.

For the third mode, the negotiating controller 88G for green picture data and the negotiating controller 88R for red picture data control the selectors 183, 184, based upon the results of comparison by the comparator 181, for outputting the control value derived from the controllers 86G and 86R of the associated channels or the concerted value MIXIN derived from the negotiating controller of the remaining channel, whichever is larger. The negotiating controller 88B for the blue picture data controls the selector 183, 184 for outputting the concerted value MIXIN derived from the negotiating controller of the remaining channel, that is the negotiating controller 88G for the green picture data. In this manner, for the MAX(G, R) mode as the third mode, the mixing ratio for the entire channels is controlled by the control valued derived from the controllers 86G, 86R, whichever is larger.

For the fourth mode, the negotiating controller 88G for green picture data and the negotiating controller 88R for red picture data control the selectors 183, 184, based upon the results of comparison by the comparator 181, for outputting the control values derived from the controllers 86G and 86R of the associated channels or the concerted value MIXIN derived from the negotiating controller 88G of the remaining channel, whichever is smaller. The negotiating controller 88B for blue picture data controls the selectors 183, 184 for outputting the concerted value MIXIN derived from the negotiating controller of the other channel, that is the negotiating controller 88G for green picture data. In this manner, the mixing ratio of the entire channels is controlled for the fourth mode, that is the MIN(G, R) mode, by the control value derived from the controller 86G or 86R, whichever is smaller.

Thus, with the digital filter system for picture data according to the present invention, when processing color picture data by first low-pass filters 81R, 81G and 81B, second low-pass filters 82R, 82G and 82B, mixers 87R, 87G and 87B, step detectors 83R, 83G and 83B and the controllers 86R, 86G and 86B, respectively of three channels, based on color data sorts, the control operations of the controllers 86R, 86G and 86B for changing the mixing ratio of the mixers 87R, 87G and 87B responsive to step detection outputs of the step detecting sections 83R, 83G and 83B by the negotiating controllers 88R, 88G and 88B are concerted for three channels, thereby enabling picture processing of the color picture data in a manner effectively freed of ringing (overshoot).

Figure 15:
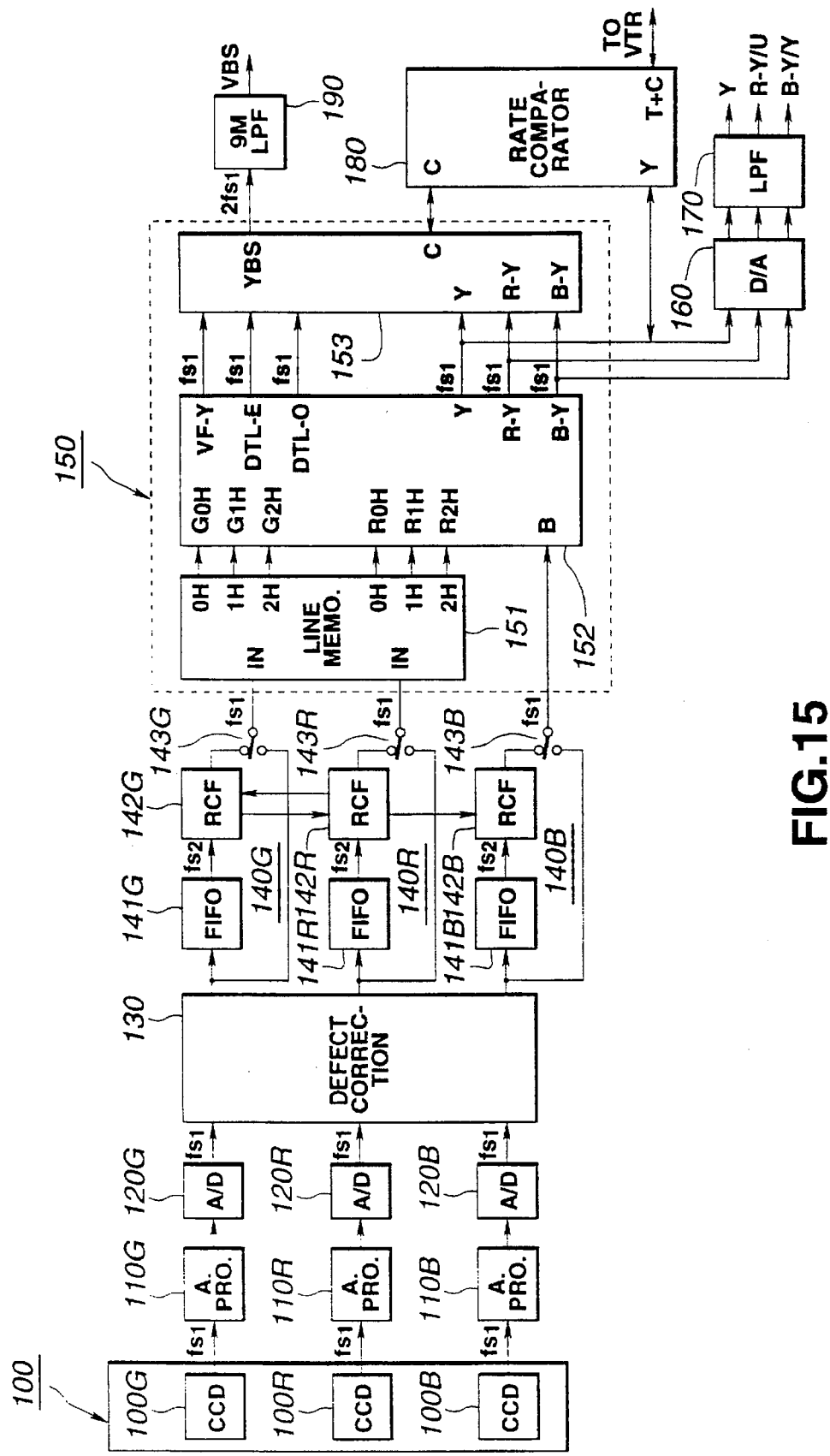
FIG. 15 is a block diagram showing a constitution of a digital processing camera having an aspect ratio converting unit employing the rate converting filter.

The rate converting filters 80R, 80G and 80B, constituted by the digital filter for picture data according to the present invention, are employed as rate converting filters for converting the aspect ratio in a digital signal processing camera configured as shown in FIG. 15.

The digital signal processing camera configured shown in FIG. 15 has an imaging unit 100, made up of three CCD image sensors 100R, 100G and 100B for imaging three-color pictures of an object having an aspect ratio of 16:9. As imaging outputs of the CCD image sensors 100R, 100G and 100B, the imaging signals of respective colors (fs1), G(fs1) and B(fs1), read out from the CCD image sensors 100R, 100G and 100B, by transfer clocks with the rate of fsi (=18 MHz), are routed by analog signal processors 110R, 110 G and 110B to A/D converters 120R, 120G and 120B, respectively, so that the imaging signals of respective colors R(ff1), G(ff1) and B(ff1) are digitized by the A/D converters 120R, 120G and 120 B at the fsi rate first sampling clocks.

The imaging unit 100 is constructed in accordance with the space pixel shift method in which the CCD image sensors 100R for imaging red picture data and the CCD image sensor 100B for imaging blue picture data are arranged with a horizontal shift equal to one-half the spatial pixel sampling period τs relative to the CCD image sensor 100G for imaging green picture data. The three CCD image sensors 100R, 100G and 100B are each a CCD image sensor for 500,000 pixels and are driven by driving clocks generated by a timing generator, not shown, at the fsi rate (fsi =18 MHz) so that the imaging signals of the respective colors R, G and B are read out at the fsi rate. As shown in FIG. 16A, showing the signal spectrum of the green color imaging signal G at the fsi rate obtained on spatial sampling of an object image by the CCD image sensor 100G, and also in FIG. 16B showing the signal spectrum of the red color imaging signal R at the fsi rate obtained on spatial sampling of an object image by the CCD image sensor 100R and the signal spectrum of the blue color imaging signal B at the fsi rate obtained on spatial sampling of an object image by the CCD image sensor 100B, the green color imaging signal G(fsi), red color imaging signal R(fsi) and the blue color imaging signal B(fsi) are phase-shifted by $\pi$ relative to one another, as shown in FIG. 16B.

The analog signal processors 110R, 110G and 110B perform analog signal processing, including various level adjustments, by noise removal by correlated double sampling (CDS), gain adjustment, black balance, white balance or shading correction, on the imaging signals of respective colors R(fs1), G(fs1) and B(fs1) obtained by the CCD image sensors 100R, 100G and 100B.

The A/D converters 120R, 120G and 120B perform A/D conversion synchronized with driving clocks at the fsi rate equal to the sampling rate of the imaging signals of respective colors R(fs1), G(fs1) and B(fs1) for digitizing the fsi rate imaging signals of respective colors R(fs1), G(fs1) and B(fs1) at the fsi rate.

The digital signal processing camera has a defect correcting section 130 fed with the imaging signals of respective colors R(fs1), G(fs1) and B(fs1), respectively digitized by the A/D converters 120R, 120G and 120B. The respective imaging signals of respective colors R(fs1), G(fs1) and B(fs1), corrected for defective pixels of the CCD image sensors 100R, 100G and 100B by the defect correcting section 130, are supplied to aspect ratio converting sections 140R, 140G and 140B of the three channels, respectively.

The aspect ratio converting sections 140R, 140G and 140B of the three channels are provided with time-axis converting sections 141R, 141G and 141B, sampling rate converting sections 142R, 142G and 142B and output selection switches 143R, 143G and 143B, respectively.

The time-axis converting sections 141R, 141G and 141B are each constituted by a FIFO memory and write the imaging signals of respective colors R(fs1), G(fs1) and B(fs1), corrected for defects by the defect correcting section 130, in these FIFO memories with sampling clocks having a first sampling rate fs1 and thin out every fourth write clock of the first clock frequency fsi for reading out respective color picture data from the FIFO memories, using the clocks having a second sampling rate equal to ¾ fs1 rate, for generating imaging signals of respective colors R(fs2), G(fs2) and B(fs2) of the second aspect ratio each having respective signal spectrum as shown in FIGS. 16C and 16D.

The sampling rate converting sections 142R, 142G and 142B are configured as digital filters for picture data according to the present invention and are made up of rate converting filters 80R, 80G and 80B of the respective three channels for respective color data as shown in FIG. 13.

The sampling rate converting sections 142R, 142G and 142B execute 8-tuple over-sampling on the imaging signals of respective colors R(fs2), G(fs2) and B(fs2) of the second aspect ratio, using an interpolation filter of MTF characteristics having a zero point at fs1/2 as shown in FIG. 16E for generating the imaging signals of respective colors R(6fs1), G(6fs1) and B(6fs1) of the second aspect ratio as shown in FIGS. 16F and 16G for subsequently generating the imaging signals of respective colors R(fs1), G(fs1) and B(fs1) of the second aspect ratio by ⅙ downsampling.

At this time, the green picture data G(6fs1), red picture data G(6fs1) and the blue picture data B(6fs1) are downsampled at ⅙ at a phase offset by ■ for generating the imaging signals of respective colors R(fs1), G(fs1) and B(fs1) of the second aspect ratio having signal spectrum as shown in FIG. 16H or 16I.

Referring to FIGS. 17A and 17B showing the sampling rate converting operation on the time axis of the sampling rate converting section 142G and the sampling rate converting sections 142R and 142B for the respective color picture data R(fs2), G(fs2) and B(fs2) of the second aspect ratio produced by the time axis converting sections 141R, 141G and 141B, the sampling rate converting sections 142R, 142G and 142B effectuate 8-tuple oversampling on respective input samples of the (¾) fs1 rate indicated by ■ marks as shown in FIGS. 17A and 17B for generating a string of 8-tuple oversamples of the 6 fs1 rate as indicated by ■ marks. The sampling rate converting sections 142R, 142G and 142B effectuate ⅙-tuple downsampling on the oversample string for taking out every sixth data from the string for generating a string of fs1 rate output samples as indicated by ■ marks.

Thus, the sampling rate converting sections 142R, 142G and 142B of the three channels effectuate ⅙-tuple downsampling at the phase of the spatial pixel shifting for effectuating aspect ratio conversion on the three-color picture signals R(fs1), G(fs1) and B(fs1) digitized at the first sampling rate fs1 from the three color signals obtained by the image pickup unit 100 operating in accordance with the spatial pixel shifting method. The picture data of respective colors R(fs1), G(fs1) and B(fs1) of the first aspect ratio are outputted from the aspect ratio converting sections 140R, 140G and 140B of the three channels at the first sampling rate fs1 as selected by the output selection switches 143R, 143G and 143B or the picture data of respective colors R(fs1), G(fs1) and B(fs1) of the first sampling rate fs1 and the second aspect ratio are outputted from the aspect ratio converting sections 140R, 140G and 140B of the three channels.

The digital signal processing camera includes a digital signal processing section 150 having a delay memory 151, a pre-processor 152 and an encoder 153.

The delay memory 151 has a two-channel delay memory and transmits green-colored picture data G0H, G1H and G0H and red-colored picture data R0H, R1H and R0H, which are the green-colored picture data G(fs1) and red-colored picture data R(fs1) delayed by 0H, 1H and 2H, H being a one horizontal scanning period, respectively, to the pre-processor 152.

The pre-processor 152 operates with the Fs1 clocks as master clocks for performing picture enhancement, pedestal addition, non-linear processing, such as gamma or knee processing or linear matrix processing, on the color picture data R(fs1), G(fs1) and B(fs1), while performing well-known high resolution processing associated with the spatial pixel shifting method in the imaging section 100. The pre-processor 152 generates picture data for high resolution monitoring VF-Y(fs1), DTL-O(fs1) and DTL-E(fs1) from the color picture data R(fs1), G(fs1) and B(fs1) by matrix processing and also generates luminance data Y(fs1) and two color difference data R-Y(fs1) and B-Y(fs1) and transmits the data to the encoder 153.

The encoder 153 generates picture data VBS (2fs1) for high resolution monitoring from the picture data VF-Y(fs1), DTL-O(fs1) and DTL-E(fs1) while generating color data C(Fs1/2 and fs1/2) from the color difference data R-Y(fs1) and B-Y(fs1).

The luminance data Y(fs1) and two color difference data R-Y(fs1) and B-Y(fs1), generated by the pre-processor 152, are converted into analog form by a digital-to-analog converter 160 and outputted via a low-pass filter 170 as analog component signals Y, R-Y/U and B-Y/V. The luminance data Y(fs1), generated by the pre-processor 152, and the color data C(fs1/2, fs1/2), generated by the encoder 153, are converted by a rate converter 180 into fs2 rate picture data Y(fs2/2)+C(fs2, fs2/2) which are transmitted to a digital VTR. The picture data VBS(2fs1), generated by the encoder 153, is supplied via a low-pas filter 190 to a high-resolution monitor, not shown.

What is claimed is:

1. A digital filter for picture data comprising:

a first low-pass filter having relatively steep cut-off characteristics for filtering input digital picture data;

a second low-pass filter having relatively moderate cut-off characteristics for filtering said input digital picture data;

mixing means for mixing the digital picture data filtered by said first and second low-pass filters;

step detection means for detecting changes in step-like values of the input digital picture data and for producing an output representation of the detected changes; and control means for controlling the mixing ratio of the filtered digital picture data from said first and second low-pass filters by said mixing means based on the output of said step detection means.

2. The digital filter for picture data as claimed in claim 1, wherein said control means cause the digital filtered data from the first and second low-pass filters and mixed by said mixing means to be gradually changed in the vicinity of a point at which the step-like values of said input digital picture data change.

3. The digital filter for picture data as claimed in claim 1, wherein said first low-pass filter is a register pre-mounted type FIR filter and said second low-pass filter is a register pre-mounted type FIR filter having a register in common with said first low-pass filter.

4. The digital filter for picture data as claimed in claim 1, wherein said step detection means is responsive to the degree of changes of the input digital picture data within a pre-set range in the vicinity of a pixel under consideration of the input digital picture data and to the degree of flatness of the value of the input digital picture data outside the pre-set range to derive said output of said step detection means.

5. The digital filter for picture data as claimed in claim 1, wherein said step detection means includes:

level difference detection means for detecting a difference in the values of the input digital picture data at pixels within a pre-set range in the vicinity of a pixel under consideration of said input digital picture data;

flatness detection means for detecting the degree of flatness of the values of said input digital picture data at pixels outside the pre-set range in the vicinity of the pixel under consideration of said input digital picture data; and step detection output decision means for producing said output of said step detection means responsive to outputs of said level difference detection means and said flatness detection means.

6. The digital filter for picture data as claimed in claim 5, wherein said step detection output decision means outputs the difference between the outputs of said level difference detection means and said flatness detection means as said output of said step detection means.

7. The digital filter for picture data as claimed in claim 5, wherein said step detection output decision means outputs the ratio between the outputs of said level difference detection means and said flatness detection means as said output of said step detection means.

8. The digital filter for picture data as claimed in claim 5, wherein said flatness detection means detects the degree of flatness of said input digital picture data based upon the value of pixels of the input digital picture data on the forward or rear side of the pre-set range in the vicinity of the pixel under consideration having a higher luminance level.

9. A digital filter for picture data comprising:

a first low-pass filter of relatively broad bandwidth for filtering input digital picture data;

a second low-pass filter of a relatively narrow bandwidth for filtering said input digital picture data;

mixing means for mixing the digital picture data filtered by said first and second low-pass filters;

step detecting means for detecting changes in step-like values of the input digital picture data and for producing an output representation of the detected changes; and control means for controlling the mixing ratio of the filtered digital data from said first and second low-pass filters by said mixing means based on the output of said step detection means.

10. The digital filter for picture data as claimed in claim 9, wherein said control means cause the mixing ratio of filtered digital data from the first and second low-pass filters and mixed by said mixing means to be gradually changed in the vicinity of a point at which the step-like values of said input digital picture data change.

11. The digital filter for picture data as claimed in claim 9, wherein said first low-pass filter is a register pre-mounted type FIR filter and said second low-pass filter is a register pre-mounted type FIR filter having a register in common with said first low-pass filter.

12. The digital filter for picture data as claimed in claim 9, wherein said step detection means is responsive to the degree of changes of the input digital picture data within a pre-set range in the vicinity of a pixel of the input digital picture data under consideration and to the degree of flatness of the value of the input digital picture data outside the pre-set range to derive said output of said step detection means.

13. The digital filter for picture data as claimed in claim 9, wherein said step detection means includes:

level difference detection means for detecting a difference in the values of the input digital picture data at pixels within a pre-set range in the vicinity of a pixel of said input digital picture data under consideration;

flatness detection means for detecting the degree of flatness of the values of said input digital picture data at pixels outside the pre-set range in the vicinity of the pixel of said input digital picture data under consideration; and step detection output decision means for producing said output of said step detection means responsive to outputs of said level difference detection means and said flatness detection means.

14. The digital filter for picture data as claimed in claim 13, wherein said step detection output decision means outputs the difference between the outputs of said level difference detection means and said flatness detection means as said output of said step detection means.

15. The digital filter for picture data as claimed in claim 13, wherein said step detection output decision means outputs the ratio between the outputs of said level difference detection means and said flatness detection means as said output of said step detection means.

16. The digital filter for picture data as claimed in claim 13, wherein said flatness detection means detects the degree of flatness of said input digital picture data based upon the value of the input digital picture data of pixels on the forward or rear side of the pre-set range in the vicinity of the pixel of the input digital picture data under consideration having a higher luminance level.

17. A digital filter system for picture data having a digital filter for each of input digital picture data of respective colors, each digital filter including:

a first low-pass filter having relatively steep cut-off characteristics for filtering the input digital picture data;

a second low-pass filter having relatively moderate cut-off characteristics for filtering said input digital picture data;

mixing means for mixing the digital picture data filtered by said first and second low-pass filters;

step detection means for detecting changes in step-like values of the input digital picture data and for producing an output representative of the detected changes; and control means for controlling the mixing ratio of the filtered digital picture data from said first and second low-pass filters by said mixing means based on the output of said step detection means.

18. The digital filter system as claimed in claim 17, further comprising negotiating control means for controlling the mixing means associated with the input digital picture data of respective colors based on control data from the control means associated with said input digital picture data of respective colors for providing a concerted mixing ratio of the filtered digital data from said first and second low-pass filters.

19. The digital filter system as claimed in claim 18, wherein said input digital picture data comprises red colored input picture data, green colored input picture data and blue colored input picture data, said negotiating control means controlling the mixing means associated with the input digital picture data of each color based upon the control data outputted from the control means associated with said green-colored input picture data.

20. The digital filter system as claimed in claim 18, wherein said input digital picture data comprises red colored input picture data, green colored input picture data and blue colored input picture data, said negotiating control means controlling the mixing means associated with the input digital picture data of each color based upon the control data outputted from the control means associated with the green-colored input picture data or the control data outputted from the control means associated with the red-colored input picture data, whichever is larger.

21. The digital filter system as claimed in claim 18, wherein said input digital picture data comprises red colored input picture data, green colored input picture data and blue colored input picture data, said negotiating control means controlling the mixing means associated with the input digital picture data of each color based upon the control data outputted from the control means associated with the green-colored input picture data or the control data outputted from the control means associated with the red-colored input picture data, whichever is smaller.

22. A digital filter system for picture data having a digital filter for each of input digital picture data of respective colors, each digital filter comprising:

a first low-pass filter of relatively broad bandwidth for filtering said input digital picture data;

a second low-pass filter of a relatively narrow bandwidth for filtering said input digital picture data;

mixing means for mixing the digital picture data filtered by said first and second low-pass filters;

step detection means for detecting changes in step-like values of the input digital picture data and for producing an output representative of the detected changes; and control means for controlling the mixing ratio of the filtered digital data from said first and second low-pass filters by said mixing means based on the output of said step detection means.

23. The digital filter system as claimed in claim 22, further comprising negotiating control means for controlling the mixing means associated with the input digital picture data of respective colors based on control data from the control means associated with said input digital picture data of respective colors for providing a concerted mixing ratio of the filtered digital data from said first and second low-pass filters.

24. The digital filter system as claimed in claim 23, wherein said input digital picture data comprises red colored input picture data, green colored input picture data and blue colored input picture data, said negotiating control means controlling the mixing means associated with the input digital picture data of each color based upon the control data outputted from the control means associated with said green-colored input picture data.

25. The digital filter system as claimed in claim 23, wherein said input digital picture data comprises red colored input picture data, green colored input picture data and blue colored input picture data, said negotiating control means controlling the mixing means associated with the input digital picture data of each color based upon the control data outputted from the control means associated with the green-colored input picture data or the control data outputted from the control means associated with the red-colored input picture data, whichever is larger.

26. The digital filter system as claimed in claim 23, wherein said input digital picture data comprises red colored input picture data, green colored input picture data and blue colored input picture data, said negotiating control means controlling the mixing means associated with the input digital picture data of each color based upon the control data outputted from the control means associated with the green-colored input picture data or the control data outputted from the control means associated with the red-colored input picture data, whichever is smaller.

* * * * *